(No Model.) 5 Sheets—Sheet 2.
H. WENZEL.
SHEDDING MECHANISM FOR LOOMS.
No. 527,093. Patented Oct. 9, 1894.
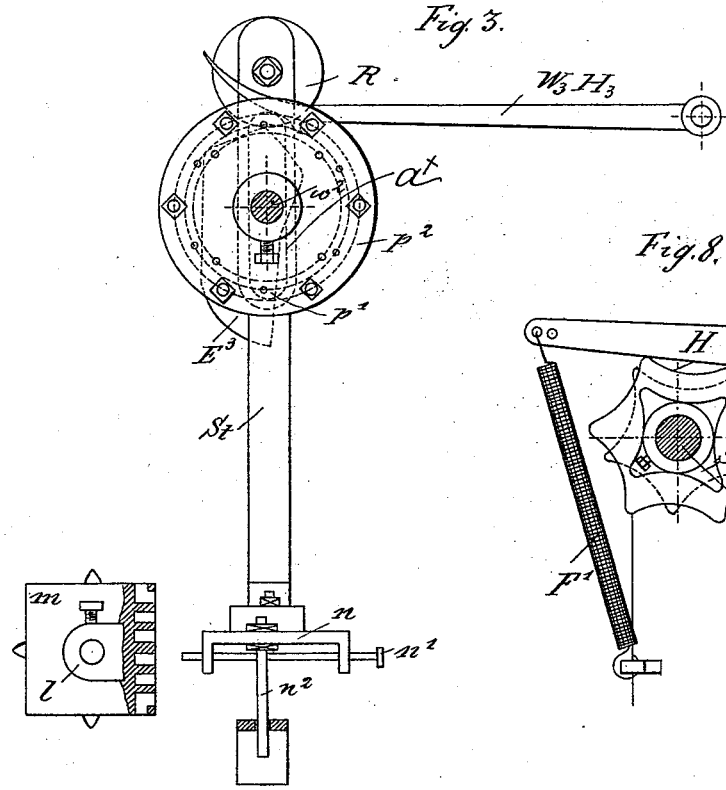
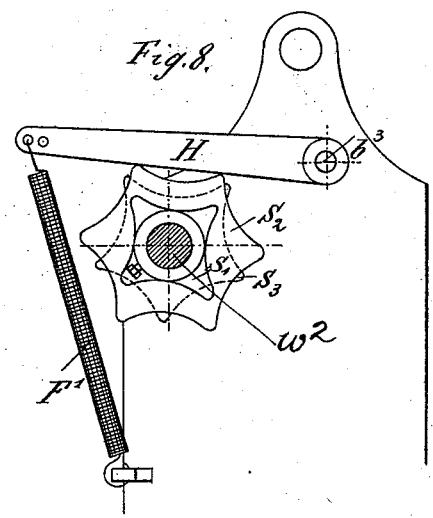
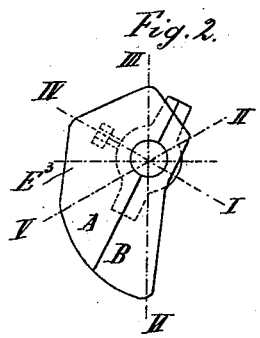
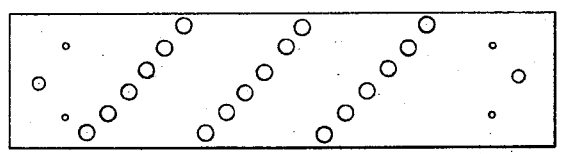
Witnesses:
E. B. Bolton
H. Van Oldenneel
Inventor:
Hermann Wenzel
By Richards &Co.
his Attorneys.

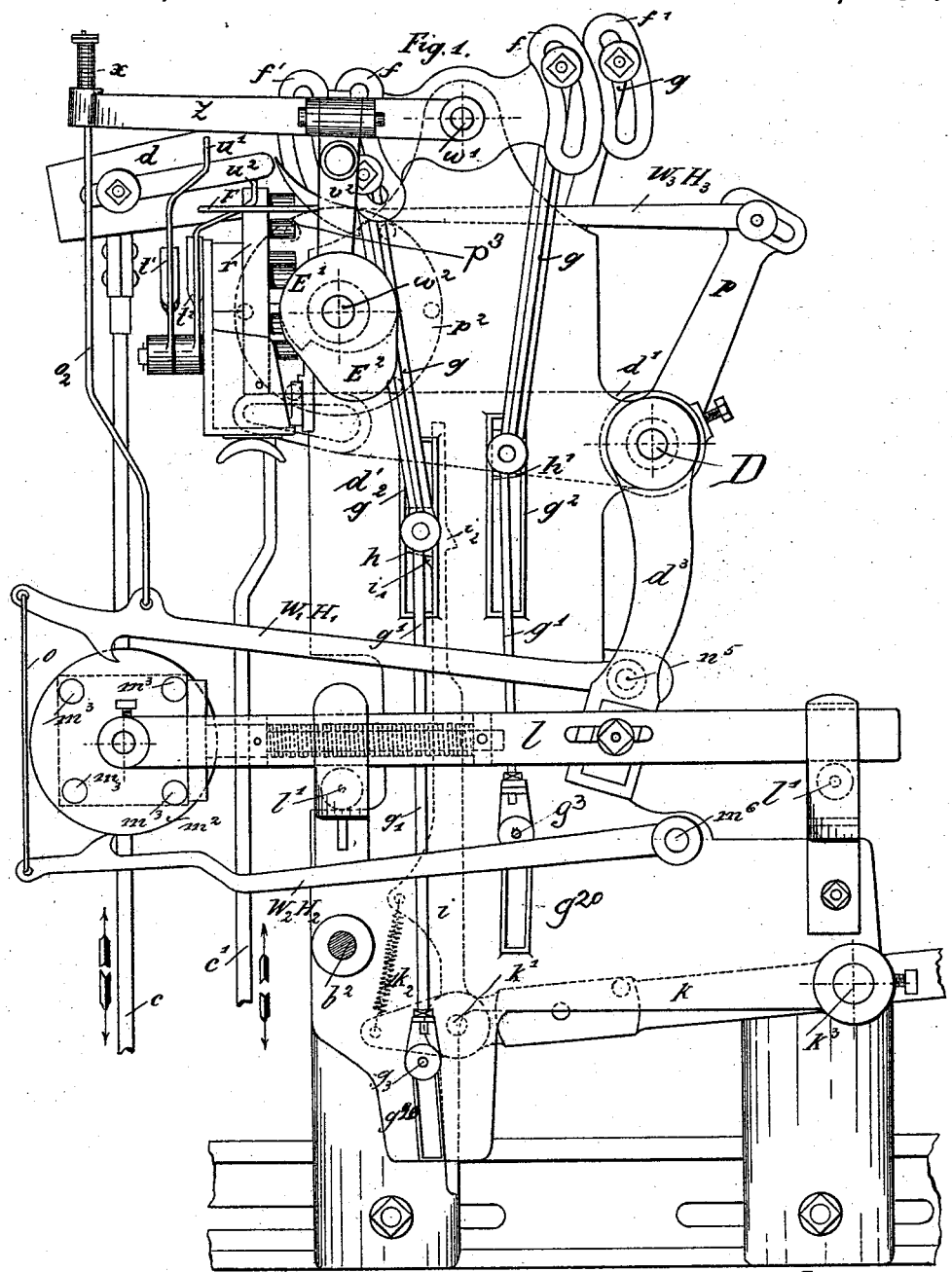

(No Model.) 5 Sheets—Sheet 3.

H. WENZEL.
SHEDDING MECHANISM FOR LOOMS.

No. 527,093. Patented Oct. 9, 1894.

Witnesses:
E. B. Bolton
H. Van Oldenneel

Inventor:
Hermann Wenzel
By Richards Leo
his Attorneys.

(No Model.)
5 Sheets—Sheet 4.
H. WENZEL.
SHEDDING MECHANISM FOR LOOMS.
No. 527,093.
Patented Oct. 9, 1894.
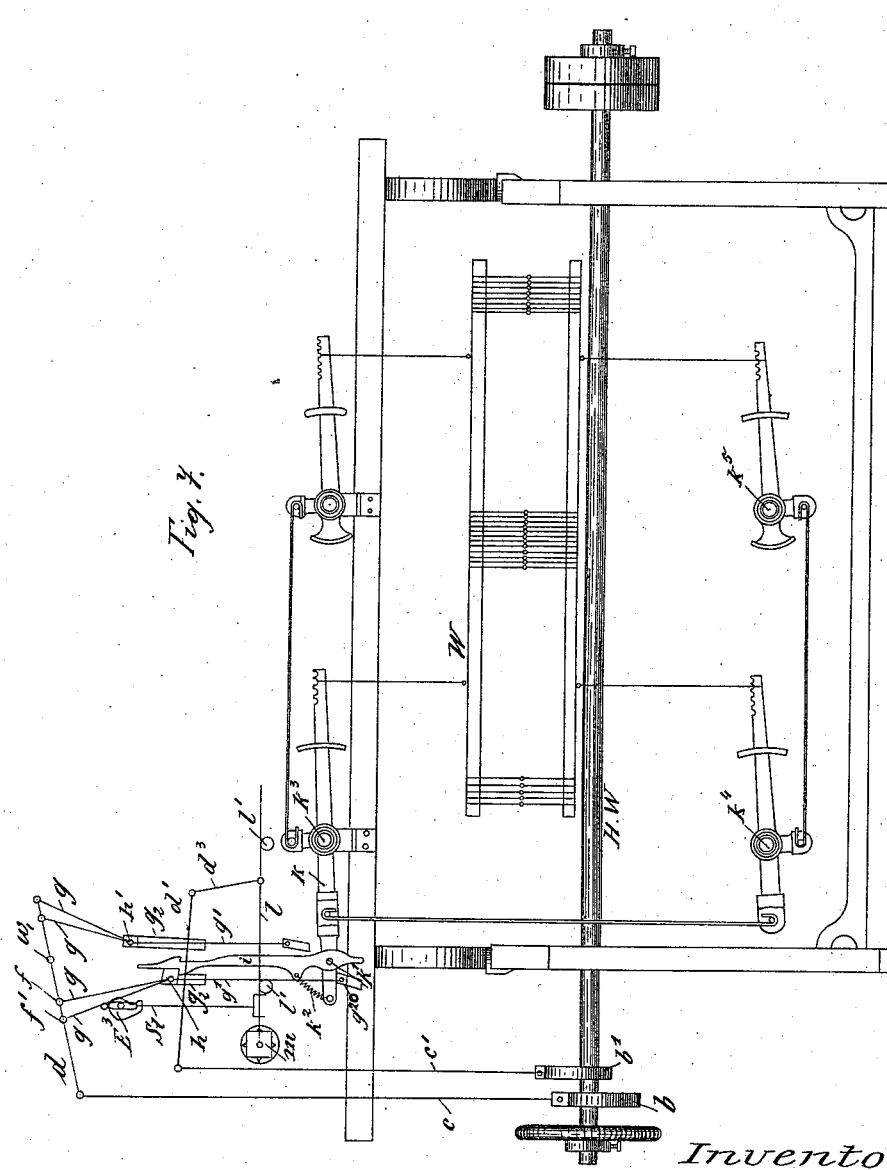
Witnesses:
Inventor:
Hermann Wenzel
By Richards & Co.
his Attorneys.

(No Model.)
5 Sheets—Sheet 5.
H. WENZEL.
SHEDDING MECHANISM FOR LOOMS.
No. 527,093. Patented Oct. 9, 1894.
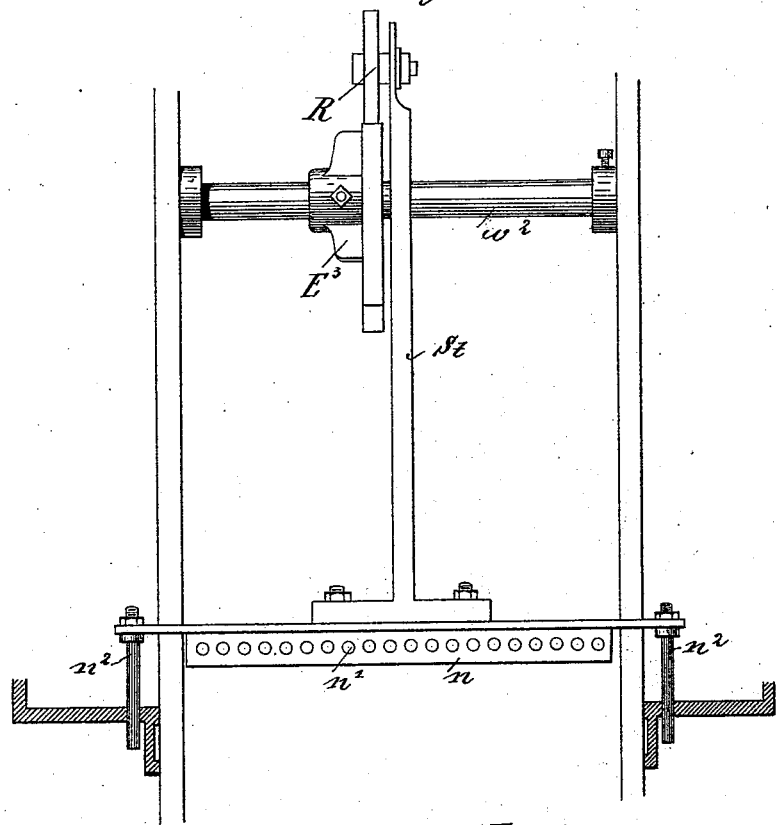
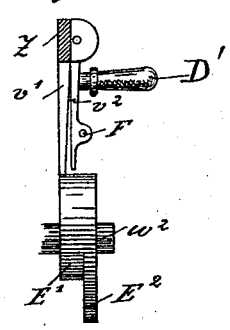
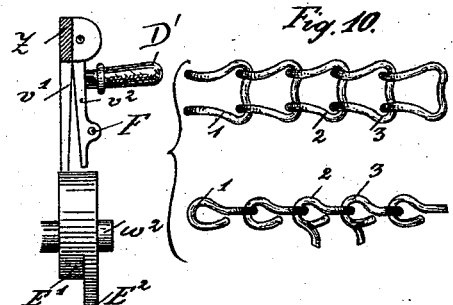
Witnesses:
E. B. Bolton
H. Van Oldenmeer
Inventor:
Hermann Wenzel
By Richards & Geo.
his Attorneys.

UNITED STATES PATENT OFFICE.

HERMANN WENZEL, OF SCHÖNLINDE, AUSTRIA-HUNGARY.

SHEDDING MECHANISM FOR LOOMS.

SPECIFICATION forming part of Letters Patent No. 527,093, dated October 9, 1894.

Application filed October 11, 1893. Serial No. 487,893. (No model.)

*To all whom it may concern:*

Be it known that I, HERMANN WENZEL, a subject of the King of Bohemia, Emperor of Austria-Hungary, and a resident of Schönlinde, in the Kingdom of Bohemia, Austria-Hungary, have invented certain new and useful Improvements in Shedding Mechanism for Looms, of which the following is a true specification.

The present invention relates to improvements in looms with the object of reducing the necessary number of cards for producing any particular pattern. Jacquards as at present constructed require a large number of cards to produce a large design, as only one longitudinal row of perforations of each card can be used for the same pattern. Certain machines have already been constructed to avoid this objection, in which the needles are brought opposite to the various rows of perforations in one card successively, the card-cylinder turning only when all the rows have come into use. The present machine uses a similar arrangement of the needles, and further a new mechanism for engaging and disengaging the turning clutch of the card-cylinder.

Figure 4:
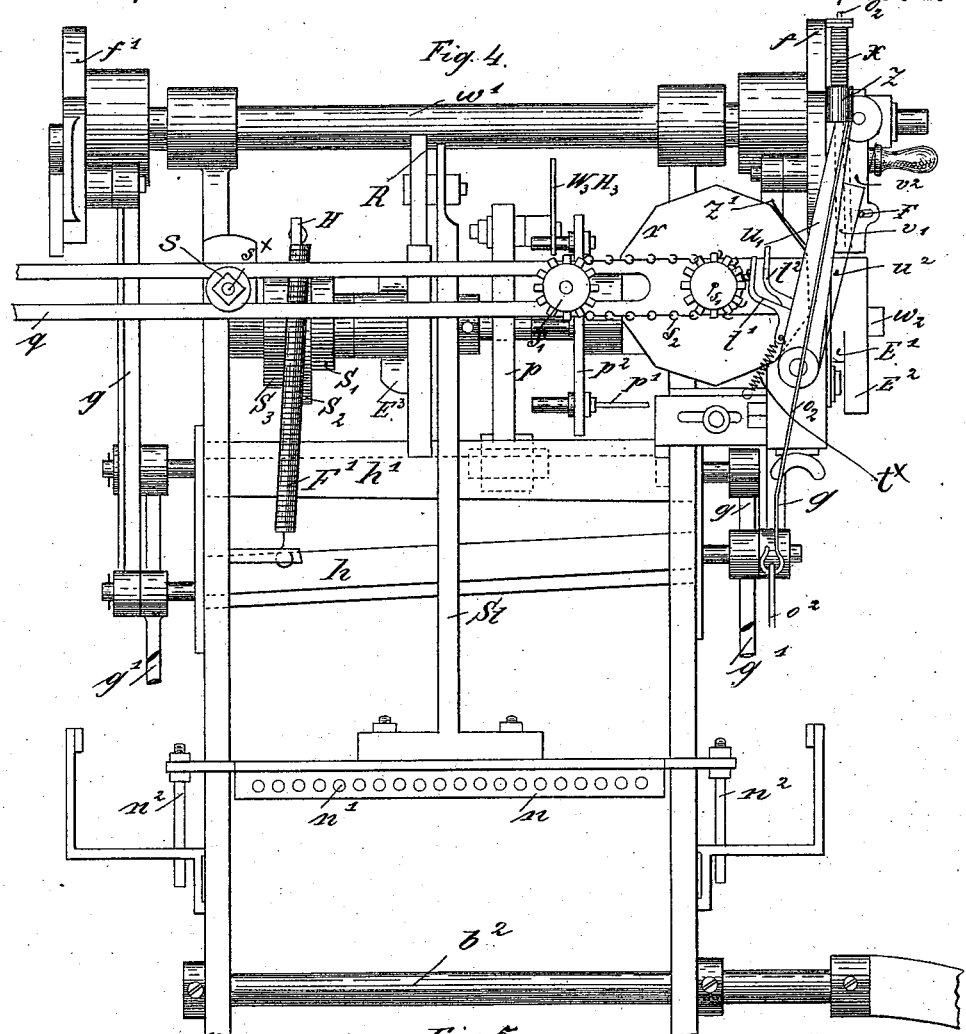
Figure 5:
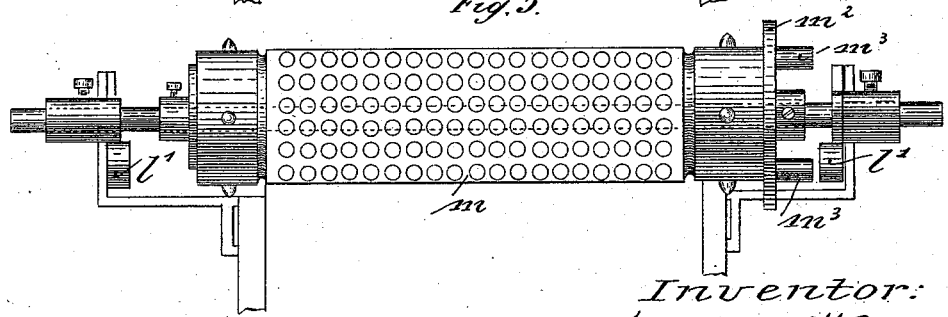

In the drawings:—Figure 1, is a side view of a part of the mechanism including the card cylinder, the pawls for operating the same and the means for controlling the pawls. Fig. 2, is a detail view of the cam for operating the needle board. Fig. 3 is a detail of the needle board with its operating means. Fig. 4, is a front view of part of the mechanism shown in Fig. 1. Fig. 5, is a front view of the card cylinder. Fig. 6, is a detail view of a card. Fig. 7, is a diagrammatic view of the entire machine. Fig. 8, is a view of a detail. Fig. 9, is a front view of the needle board with operating means therefor. Fig. 10, shows the chain for controlling one of the movements, and Figs. 11, and 12 are views of a controlling cam.

H W is the main driving shaft of the machine, from which the levers $k$, seated on the fixed shaft $k^3$ Figs. 1 and 7 are actuated by means of well-known intermediate connections consisting of the eccentric $b$ on the shaft H W Fig. 7 the rod $c$ Figs. 1 and 7 extending therefrom to the lever $d$ to operate the double levers $f f'$ fixed on the shaft $w'$ from which the rods $g$ extend to connect with the blades $h\ h'$, Figs. 1 and 7, moving in guides $g^2$ of the frame and designed to engage the teeth $i'\ i^2$ on the lifting hooks $i$. From the rods $g$ the rods $g'$ extend to the bolts $g^3$ which are thus raised and lowered in the guides $g^{20}$. The lifting hooks are connected with the levers K and are pressed by the springs $k^2$ Fig. 1. Through this machinery the levers $k$ are operated and these levers are connected with the heddle frames W, Fig. 7, as shown and also with the pair of levers $k^4$, $k^5$, by which the frames are raised and lowered. The springs $K^2$ referred to press the lifting hooks to the left, said springs being secured to the lifting hooks and to the ends of the levers K.

The card cylinder $m$ is rotated by the hook pawls W' H', W² H² pivoted at $n^5\ m^6$ to the frame, said cylinder being carried and reciprocated by the slides $l$ running on the rollers $l'$ to which slides movement is given by the lever $d^3$ mounted on a shaft D in the frame, the lever $d'$ being also fixed on the shaft D, the rod $c'$ connecting the lever $d'$ and the eccentric $b'$ on the shaft H W Fig. 7 whereby the rod C' is operated.

In the present invention the rotation of the card cylinder after every weft, is avoided by bringing the needles successively from one to the other row of perforations of the card. A great economy in pattern cards is the result, while each card can be used for all the wefts of one pattern, it being only necessary to turn the cylinder when a new pattern is to be made, or when there are more wefts to the pattern than rows of perforations in a card. In order to be able to effect this, I provide, besides the arrangement for displacing the needle-board, a special arrangement for engaging and disengaging the turning pawls of the card cylinder.

The needle-board $n$ is provided with a split lifting rod S$t$, Figs. 3, 4, 7 and 9 which can rise and sink on a cam E³ by means of a guide roller R, Fig. 3. The cam is attached to a shaft $w^2$. The rod S$t$ passes over this shaft by means of its slit $a^\times$, Fig. 3. Guides $n^2$ are also provided at both ends of the needle board Figs. 4 and 9 for guiding the needle board in its vertical movement. The shaft $w^2$ receives its motion through a lever $p$ (Fig. 1) and pawl W³ H³ (Figs. 1 and 3), which gears in a pin-wheel $p^2$ fixed on shaft $w^2$, (Figs. 1, 3 and 4.) The cam $E^3$ (Fig. 2) has as many steps I, II, III, IV, V, VI, Fig. 2 as rows of perforations are provided in the card, and for each weft one of these steps is brought under the guide roller R, in order to bring the needles $n'$ of the board $n$ in their proper position against the card cylinder. If cam $E^3$ is with its lowest step I under roller R, then the needles are opposite the lowest row of perforations, and so on with the second, third, &c., rows.

If cards having more or less than six rows of perforations are used then the cam $E^3$ must be replaced by another cam corresponding to the number of rows of perforations for which reason it is advisable to make the cams in two parts in order to permit the ready removal of one cam and the substitution of another. It will then be necessary to have a different angular rotation of shaft $w^2$ for each cam by pawl $W^3 H^3$. In order to be able to effect this rotation for a number of cams by means of one pin-disk $p^2$, this latter is provided with so many concentric rows of holes as there are cams, and each row has as many holes as the corresponding cam has steps. The row of holes on disk $p^2$ which comes into use is filled out with pins or bolts, behind which the pawl $W^3 H^3$ catches, while the other rows of holes remain free. In Fig. 3 three concentric rows with six, five and four holes are shown so that here the needle board can be operated with three sizes of cams and cards having six, five or four rows of holes may be used.

For the cam $E^3$ as many stop disks $S' S^2 S^3$ are attached to shaft $w^2$ as cams are used (Figs. 4 and 8), and each disk has so many pressure surfaces as the corresponding cam has steps for the roller R. On one surface presses a pressure lever H held down by a spring F'. This lever turns and slides on a long frame-pivot $b^3$ so that it can be pushed over the disk at the moment in operation. The spring F' thereby receives a more or less inclined position and is slightly extended.

After every weft the cam $E^3$ receives a rotation from the main shaft H W through the connecting rod $c'$, levers $d'$ $p$ on shaft D and pawl $W^3 H^3$ Fig. 1, so that the needle-board is lifted by a step by step motion. As soon as this upward step by step motion has been completed, the needle-board falls back to its lowest position after the next turn of the cam, and the pattern is either then repeated without a rotation of the cylinder taking place, or another pattern is produced for which a rotation of the cylinder is necessary, bringing another card before the needles. This is done by the following feeding-device.

On the needle-board-cam shaft $w^2$ are seated, outside the frame near the weaver's stand, one high cam $E^2$ and one low cam $E'$ cast in one piece, (Figs. 1, 4, 11 and 12.) Resting on the low cam $E'$ is an arm $v'$ which is firmly connected to a lever Z behind the arm $v^2$ which is pivotally connected to the lever. Lever Z works loosely on the shaft $w'$ and is connected at its free end by a draw-rod $o^2$ with the two pawls $H' W'$ and $H^2 W^2$ which are connected by the link $o$, so that when one clutch is thrown in the other is thrown out of action. The pivoted arm $v^2$ carries a finger or pin F, Figs. 1, 4, 11, and 12. Usually the two arms $v'$ and $v^2$ are under the influence of the low cam $E'$ (Fig. 11) and the lever Z is held up by the arm $v'$, or, if the cam $E'$ comes with its lower surface under the arm $v'$, the lever Z is still held up by a special lever $u'$ (Fig. 1) in such a manner that the two pawls $W' H'$ and $W^2 H^2$ are out of gear with the pins $m^3$ of the cylinder disk $m^2$. The cam $E'$ as shown in Fig. 1 is formed with an abrupt shoulder connecting what is termed herein the "lower surface" or low part with the high part.

If a rotation of the card cylinder is to be made, then the feeding-device proper comes into effect.

A link-chain is led over two chain-wheels $s' s'$, of which the one is loosely arranged together with a polygonal feeding-disk $r$ on an axle (Fig. 4). This axle is immovably fixed in a cleft rod $q$ while the axle for the other wheel $s'$ has an adjustable bearing in the rod $q$, so that different lengths of chain with especial link-arrangements can be used when required. Rod $q$ can be turned on the pivot $s^\times$ and held by nut $s$ on the frame in order to bring the link-chain device in relation with the pawl operating mechanism described above. The links of the chain are made in the forms, 1, 2 and 3 as shown in Fig. 10—that is the links 1 are plain and the links 2, 3 are formed with studs or projections, the studs of the links 2 being on one side or edge of the chain while the studs on the other links 3 are on the other side and out of line therewith—and these links are led past two buttons $t' t^2$ under tension of slight coil springs $t^\times$. This is effected by means of a bolt $p'$, attached to the disk $p^2$, which, during each rotation of the disk $p^2$, engages the periphery of and turns the polygonal disk $r$ the length of one link. As the disk $p^2$ turns the bolt or pin $p'$ is brought into contact with one of a series of pins $p^3$ shown in Fig. 1 projecting from the face of the disk $r$ and the latter is thus turned. In order to prevent the polygonal disk $r$ unduly rotating, a spring Z', is laid against its circumference. If a link 1 passes the buttons $t' t^2$, these latter are not moved and the position of the pawls $W' H' W^2 H^2$ remains unaltered; but if a link 2 with its stud or projection now passes the button $t'$, the same is pushed back, button $t'$ bears against supporting lever $u'$ and consequently presses this away from under the lever Z. The lever is then only supported on the low cam $E'$ and when its lower surface comes under the arm $v'$, the lever Z sinks and the upper pawl W' H' gears behind a pin $m^3$ of the cylinder $m$. If the cylinder is now withdrawn from the row of needles, it receives a rotation in a forward sense and a new pattern card takes its position before the needles. If on the other hand, a link of the form 3, comes against button $t^2$, then the lever $u^2$ carrying the button presses the finger F of the arm $v^2$ and consequently arm $v^2$ itself, forward. Arm $v^2$ comes in contact with the high cam $E^2$ (Fig. 12) which on its part raises the lever Z and the pawl $W^2 H^2$. The lower pawl $W^2 H^2$ gears then behind a pin $m^3$ of the cylinder which is then turned backward during its horizontal movement. By this means a card which has already been used is brought before the row of needles.

It will be noticed by Figs. 11 and 12 that the relative lengths of the arms $v'$ and $v^2$ are such that the arm $v^2$ is slightly raised from contact with the cams when the parts are in the position shown with the arm $v'$ resting on the cam and the arm $v^2$ is then free to assume its normal position after having been acted upon by the high cam $E^2$. This return to normal position is effected through the counterweight D' shown in Figs. 4, 11 and 12 attached to the arm $v^2$.

The arrangement of the links of the chain to be used is according to the pattern to be produced, and the feeding device $r, s', s', q$, is only then in use when several patterns are to be produced, that is when several pattern cards are required, or when the wefts in one pattern are more numerous than the rows of perforations in one card so that another card must be used. If however, the feeding device is not required to be used, the cleft rod is turned on pivot $s$ so that the polygonal disk $r$ no longer stands in relation with the bolt $p'$. The spring $x$ on the draw-rod $o^2$ gives a certain elasticity to the pawls, said draw rod passing through the lever Z and having a button at its upper end resting on said spring $x$ which encircles the rod and bears on the lever Z as clearly shown in Fig. 1.

What I claim, and desire to secure by Letters Patent of the United States, is—

1. In combination in a loom, the card cylinder, the adjustable needle board, the shaft $w^2$, the cam $E^3$ thereon means for turning said shaft, the connection from said cam to the needle board to move the needle board step by step, the pawls for operating the card cylinder, the means for reciprocating the cylinder against the pawls to turn the cylinder, the lever Z connected to the pawls for throwing the same into and out of action, the cam for operating the lever Z means for throwing the lever Z into and out of connection with the cam, said means comprising the chain, means for operating the same and the devices between the chain and the lever Z, substantially as described.

2. In combination, in a loom, the card cylinder, the adjustable needle board, the shaft $w^2$, the cam $E^3$ thereon means for turning the shaft, the connection from the cam to the needle board the pawls for operating the card cylinder, the means for reciprocating the cylinder against the pawls to turn the cylinder, the lever Z connected to the pawls for throwing them into and out of action, the cam E' $E^2$, the arm $v'$ on the lever Z arranged in line with the cam portion E', the movable arm $v^2$ carried by the lever Z and arranged to be moved into and out of line with the cam portion $E^2$, the means for holding up the lever Z, and the chain for operating the holding means and also the movable arm $v^2$, substantially as described.

In witness whereof I have hereunto set my hand in presence of two witnesses.

HERMANN WENZEL.

Witnesses:
 JOSEF HERBST,
 EMIL FRITSCHE.